United States Patent
Kawasaki et al.

(10) Patent No.: US 8,435,475 B2
(45) Date of Patent: May 7, 2013

(54) SPHERICAL ORGANIC POLYMER-SILICON COMPOUND COMPOSITE PARTICLES, HOLLOW PARTICLES AND THEIR PRODUCTION METHODS

(75) Inventors: Takashi Kawasaki, Omuta (JP); Motoharu Fukazawa, Omuta (JP); Isao Sugimoto, Omuta (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 23 days.

(21) Appl. No.: 13/412,790

(22) Filed: Mar. 6, 2012

(65) Prior Publication Data

US 2012/0164052 A1    Jun. 28, 2012

Related U.S. Application Data

(62) Division of application No. 12/666,734, filed as application No. PCT/JP2008/061670 on Jun. 26, 2008.

(30) Foreign Application Priority Data

Jun. 26, 2007 (JP) ................................ 2007-167582
Jun. 4, 2008 (JP) ................................ 2008-147083
Jun. 5, 2008 (JP) ................................ 2008-147820

(51) Int. Cl.
  *C01B 33/12* (2006.01)
  *C04B 16/08* (2006.01)
  *C08K 7/22* (2006.01)

(52) U.S. Cl.
  USPC .......................................... 423/335; 106/409

(58) Field of Classification Search .......... 423/335–340; 106/409
  See application file for complete search history.

(56) References Cited

U.S. PATENT DOCUMENTS

| | | | |
|---|---|---|---|
| 4,883,539 | A | 11/1989 | Mattila et al. |
| 6,221,326 | B1 | 4/2001 | Amiche |
| 7,781,060 | B2 | 8/2010 | Li et al. |
| 2005/0214644 | A1 | 9/2005 | Aramata et al. |
| 2005/0244322 | A1 | 11/2005 | Chen et al. |
| 2006/0120941 | A1* | 6/2006 | Chen et al. .............. 423/335 |
| 2006/0149000 | A1 | 7/2006 | Ikuta et al. |
| 2007/0036705 | A1 | 2/2007 | Butts et al. |
| 2007/0231500 | A1 | 10/2007 | Rakotoarison |
| 2008/0090070 | A1 | 4/2008 | Muraguchi et al. |

FOREIGN PATENT DOCUMENTS

| | | |
|---|---|---|
| JP | 63-268771 | 11/1988 |
| JP | 6-142491 | 5/1994 |
| JP | 8-12346 | 1/1996 |
| JP | 2001-233611 | 8/2001 |
| JP | 2003-522621 | 7/2003 |
| JP | 2004-203683 | 7/2004 |
| JP | 2005-263550 | 9/2005 |
| JP | 2006-256921 | 9/2006 |
| JP | 2006-335605 | 12/2006 |
| WO | 2006/006207 A1 | 1/2006 |

OTHER PUBLICATIONS

Caruso et al., "Nanoengineering of Inorganic and Hybrid Hollow Spheres by Colloidal Templating", Science 282, Nov. 6, 1998, 1111-1114.*
Tissot et al., "SiOH-Functionalized Polystyrene Latexes. A Step toward the Synthesis of Hollow Silica Nanoparticles", Chem. Mater. 2002, 14, 1325-1331.*
Office Action issued Jun. 30, 2011, in Chinese Patent Application No. 200880020626.1 filed Jun. 26, 2008.
Khanal, et al., "Synthesis of Silica Hollow Nanoparticles Templated by Polymeric Micelle with Core-Shell-Corona Structure", J. Am. Chem. Soc., vol. 129, pp. 1534-1535 (2007).
Chen, et al., "Preparation of Hollow Silica Nanospheres by Surface-Initiated Atom Transfer Radical Polymerization on Polymer Latex Templates", Adv. Funct. Mater., vol. 15, No. 1, pp. 113-117 (Jan. 2005).
Zhang, et al., "Synthesis and Characterization of $CaCO_3@SiO_2$ core-shell nanoparticles", Powder Technology, vol. 141, pp. 75-79 (2004).
Darbandi, et al., "Hollow Silica Nanospheres: In situ, Semi-In situ, and Two-Step Synthesis", Chem. Mater., vol. 19, pp. 1700-1703 (2007).
Deng, et al., "A Novel Method for the Fabrication of Monodisperse Hollow Silica Spheres", Langmuir, vol. 22, pp. 6403-6407 (2006).
Vollrath, et al., "Comparison of dissolution procedures for the determination of cadmium and lead in plastics", Fresenius J. of Anal. Chem., vol. 344, pp. 269-274 (1992).
Chung, et al., Templated Synthesis of Silica Hollow Particles by Using Spray Pyrolysis, Journal of Chemical Engineering of Japan, vol. 37, No. 9, pp. 1099-1104 (2004).
Cornelissen, et al., "Versatile synthesis of nanometer sized hollow silica spheres", The Royal Society of Chemistry, pp. 1010-1011 (2003).

* cited by examiner

*Primary Examiner* — Anthony J Zimmer
(74) *Attorney, Agent, or Firm* — Oblon, Spivak, McClelland, Maier & Neustadt, L.L.P.

(57) ABSTRACT

The present invention is to provide hollow particles with a low degree of agglomeration and having a high roundness, and a process for producing them.

Hollow particles comprising a silicon compound, having an average particle size of from 5 to 65 nm and an average roundness of at least 0.90, and having a shell comprising the silicon compound and having a thickness of from 1 to 20 nm. Further, a method for producing hollow particles, which comprises adding sulfuric acid to a liquid containing spherical organic polymer-silicon compound composite particles having a core comprising an organic polymer and a shell comprising a silicon compound in a medium containing at least 95 mass % of water, followed by heating to carbonize the organic polymer thereby to convert it to a carbide, and subjecting the carbide to decomposition using a liquid oxidizing agent other than sulfuric acid.

9 Claims, No Drawings

SPHERICAL ORGANIC POLYMER-SILICON COMPOUND COMPOSITE PARTICLES, HOLLOW PARTICLES AND THEIR PRODUCTION METHODS

This is a divisional application of U.S. application Ser. No. 12/666,734, filed Dec. 24, 2009, which is a 371 of PCT/JP08/061670 filed on Jun. 26, 2008.

TECHNICAL FIELD

The present invention relates to spherical organic polymer-silicon compound composite particles, hollow particles, and methods for producing such spherical organic polymer-silicon compound composite particles and hollow particles.

BACKGROUND ART

In recent years, along with progress of downsizing and layer thickness reduction of various industrial components, reduction in the size of starting materials used is in progress. With respect to a powder used as various starting materials, fine particles having a particle size of several to several tens nanometer are required as particles constituting the powder. Further, for application which requires high fluidity or high filling properties of particles, hollow spherical particles excellent in such performance are heavily used.

Various hollow spherical particles have been studied as an antireflection material, a low dielectric material, a filler such as an insulating material, a carrier for drug delivery system, etc. since they have a low refractive index, a low dielectric constant and a high porosity. Hollow particles comprising a silicon compound such as silica are excellent in chemical stability, and silica hollow particles having a particle size of several to several tens nanometer are further excellent in transparency, fluidity and filling properties and are thereby particularly heavily used.

As a method for producing hollow particles, various methods have been proposed, and a method of removing the core of core-shell composite particles having an outer shell comprising a silicon compound such as silica, thereby to obtain hollow particles, the interior of which is hollow, is commonly employed. As the core, various compounds such as an inorganic compound and an organic polymer have been studied. As the method for removing the core, in the case of using an inorganic compound, removal by dissolution with an acid (Patent Document 1) or an acidic cationic resin (Patent Document 2) is commonly employed, or in the case of using an organic polymer, a method comprising drying and heating to a level of 500° C. to remove the organic polymer by pyrolysis or by burning is commonly employed (Patent Documents 3 and 4).

In the case of removing the core of core-shell composite particles employing an organic polymer for the core, drying operation and pyrolysis operation by heating are required. In a series of these operations, first, the core-shell composite particles are formed into agglomerates once they are in a dry state. Further, the composite particles are bonded by subsequent heating for core removal, whereby they are formed into strong agglomerates, such being problematic. To solve such a problem, a method has been studied wherein a salt solution of e.g. sodium chloride containing the core-shell composite particles is dried to precipitate a salt among the core-shell composite particles, followed by heating to subject the organic polymer to pyrolysis to convert the core-shell composite particles to hollow particles, which are then washed with water to remove the salt among the hollow particles, thereby to obtain hollow particles with a small amount of agglomerates (Non-Patent Document 1).

Further, as a sample decomposition method for quantitative analysis of cadmium and lead in the organic polymer, wet ashing method using sulfuric acid and hydrogen peroxide, microwave digestion procedure using nitric acid and hydrogen peroxide, etc. have been known (Non-Patent Document 2). However, it is unclear whether the organic polymer covered with an inorganic oxide can be decomposed by such a method.

Further, since particles comprising a single material cannot have required properties in some cases, and accordingly in such a case, composite particles using a plurality of materials in combination are used. Particularly, spherical organic polymer-silicon compound composite particles having a core comprising an organic polymer and a shell comprising a silicon compound are used as e.g. a material of hollow silica spherical particles having a particle size of from several to several tens nanometer to be used as a low refractive index filler in an optical application.

As a method for producing spherical organic polymer-silicon compound composite particles, a method of preliminarily preparing a core of an organic polymer and covering it with a shell of a silicon compound is commonly employed, but conventional spherical organic polymer-silicon compound composite particles have the following problems.

When organic polymer particles are covered with a shell of a silicon compound, if the organic polymer particles are assembled to form agglomerates in a liquid containing the particles, the agglomerates are not spherical even though the organic polymer particles are spherical by themselves and accordingly obtainable composite particles comprising the agglomerates as the core are also not spherical. To prevent such formation of agglomerates, a method of adding an alcohol-soluble polymer or a dispersibility improving agent to the liquid containing the organic polymer particles has been employed (Patent Document 3). However, by such a method, although spherical composite particles of from 0.07 μm (70 nm) to 50 μm are obtained, particles of from 5 to 65 nm which are smaller than the above particles are not obtained.

As another method, a method of introducing an amino group ($-NH_2^+$) and a carboxy group ($-CO_2^-$) to the surface of fine polystyrene particles of several tens nanometer, and the covering the particles with silica has been proposed (Non-Patent Document 3). However, with respect to particles having a diameter less than 100 nm (25 nm and 40 nm), moniliform agglomerates comprising a range of several particles are observed by a transmission electron microscope (Non-Patent Document 3). Further, the following other methods have been proposed, but they have such problems that a preparation procedure is complicated since covering with silica is carried out in a multilayer manner (Patent Document 4), or no fine particles less than 100 nm can be obtained (Non-Patent Document 1) in the same manner as disclosed in Patent Document 3.

As a method for producing hollow particles having a particle size of from several to several tens nanometer, various methods have been proposed, and a method of removing the core of core-shell composite particles having an outer shell (shell) comprising silica thereby to obtain hollow particles, the interior of which is hollow, is commonly employed. Such a method is also called as a template method since the core is utilized as if it is a template. Further, the method of using an inorganic compound as the core is called an inorganic template method, and a method of using an organic polymer is called an organic template method.

As the inorganic template method, a method of using as the core a composite of silica with another inorganic compound, which can be removed by dissolution with an acid or an acidic cation exchange resin is possible (Patent Document 1), a method of using calcium carbonate as the core (Patent Documents 5 and 6) and a method of using zinc oxide as the core (Patent Document 2) have been proposed. As the organic template method, a method of using a styrene polymer or a styrene/divinylbenzene copolymer as the core particles has been proposed (Patent Documents 3 and 4).

In the template method, removal of the core is required. A specific method of removing the core is, in the case of the inorganic template method, removal by dissolution of the core with an acid (Patent Documents 1, 5 and 6) or with an acidic cation exchange resin (Patent Document 2). Further, in the case of the organic template method, it is removal by heating the core-shell composite particles at from 500 to 600° C. to remove the organic polymer core by pyrolysis or by burning (Patent Documents 3 and 4).

However, such conventional template methods have the following problems. The core removing method in the inorganic template method is dissolution with an acid or with an acidic cation exchange resin, and it can be carried out in a state where the core-shell composite particles are dispersed in a liquid (in a slurry state), and in addition, at a relatively low temperature in the vicinity of room temperature. Accordingly, agglomeration of the hollow particles is easily suppressed, and hollow particles or a slurry with good dispersibility can easily be obtained. However, calcium carbonate or zinc oxide to be used as the core is crystalline and has a crystal habit, and the crystal habit is reflected even on the core-shell composite particles covered with silica and the hollow particles from which the core is removed, whereby no spherical hollow particles can be obtained (Patent Documents 2, 5 and 6). In order to obtain hollow particles closer to spherical, a composite of silica having no crystal habit with another inorganic compound is used for the core (Patent Document 1), but in such a case, elliptic particles are formed as byproducts together with hollow spherical particles, and accordingly the average roundness is less than 0.90.

If the average roundness of the hollow particles is less than 0.90, when the particles are used as a filler, fluidity and filling properties tend to be insufficient, and properties intrinsic to the hollow particles, such as a low refractive index, a low dielectric constant and a high porosity may not sufficiently be obtained. Accordingly, the average roundness of the hollow particles is preferably at least 0.90, more preferably at least 0.95.

On the other hand, in the organic template method, the organic polymer used as the core is prepared by a suspension polymerization method or an emulsion polymerization method. Especially by an emulsion polymerization method, an organic polymer having a uniform particle size at a level of from several tens to several hundreds nanometer and also having a high average roundness can be prepared.

However, in a conventional method of removing the core of the organic polymer, first, the core-shell composite particles are dried when heated at low temperature and at that point, formed into agglomerates. And, the particles are bonded by subsequent heating at high temperature for pyrolysis or burning of the core, whereby the particles are formed into strong agglomerates, such being problematic. To solve such a problem, a method has been studied wherein a salt solution of e.g. sodium chloride containing the core-shell composite particles is dried to precipitate a salt among the core-shell composite particles, followed by heating to subject the organic polymer to pyrolysis to convert the core-shell composite particles to hollow particles, which are then washed with water to remove the salt among the hollow particles, thereby to obtain hollow particles with a small amount of agglomerates (Non-Patent Document 1).

However, by this method, when the salt solution is prepared, a large amount of a salt is added to a slurry containing the core-shell composite particles, and accordingly the core-shell composite particles which are in a hydrophilic colloidal state, are agglomerated by salting out at that point, whereby no sufficient effect of preventing agglomeration can be obtained. Further, as a sample decomposition method for quantitative analysis of cadmium and lead in the organic polymer, wet ashing method using sulfuric acid and hydrogen peroxide, microwave digestion procedure using nitric acid and hydrogen peroxide, etc. have been known (Non-Patent Document 2). However, it is unclear whether the organic polymer covered with an inorganic oxide can be decomposed by such a method since there is no application example.

Patent Document 1: JP-A-2001-233611
Patent Document 2: JP-A-2006-335605
Patent Document 3: JP-A-6-142491
Patent Document 4: JP-A-2003-522621
Patent Document 5: JP-A-2005-263550
Patent Document 6: JP-A-2006-256921
Non-Patent Document 1: Journal of Chemical Engineering of Japan, Vol.37, No.9, p.1099 (2004)
Non-Patent Document 2: Fresenius Journal of Analytical Chemistry, Vol.344, No.6, p.269 (1992)
Non-Patent Document 3: Chemical Communication, p.1010 (2003)

DISCLOSURE OF THE INVENTION

Object to be Accomplished by the Invention

The object of the present invention is to provide spherical organic polymer-silicon compound composite particles, hollow particles obtainable from such composite particles, with a low degree of agglomeration and having a high roundness, and their production methods.

Means to Accomplish the Object

That is, the present invention provides the following.

1. Hollow particles comprising a silicon compound, having an average particle size of from 5 to 65 nm and an average roundness of at least 0.90, and having a shell comprising the silicon compound and having a thickness of from 1 to 20 nm.
2. The hollow particles according to the above 1, having their surface treated with a silane coupling agent.
3. The hollow particles according to the above 1 or 2, wherein the silicon compound is silica.
4. A method for producing hollow particles, which comprises adding sulfuric acid to a liquid containing spherical organic polymer-silicon compound composite particles having a core comprising an organic polymer and a shell comprising a silicon compound in a medium containing at least 95 mass % of water, followed by heating to carbonize the organic polymer thereby to convert it to a carbide, and subjecting the carbide to decomposition using a liquid oxidizing agent other than sulfuric acid.
5. The method for producing hollow particles according to the above 4, wherein to the liquid containing spherical organic polymer-silicon compound composite particles, sulfuric acid is added in an amount of from 10 to 200 mL per 1 g of the spherical organic polymer-silicon compound composite particles contained in the liquid.
6. The method for producing hollow particles according to the above 4 or 5, wherein the heating temperature after sulfuric acid is added is from 200° C. to 300° C., and the liquid oxidizing agent is at least one member selected from the group consisting of nitric acid, hydrogen peroxide and a chloric acid.
7. A method for producing hollow particles, which comprises adding at least one liquid oxidizing agent selected from the group consisting of hydrogen peroxide, hypochlorous acid, chlorous acid, chloric acid and perchloric acid, and nitric acid, to a liquid containing spherical organic polymer-silicon compound composite particles having a core comprising an organic polymer and a shell comprising a silicon compound in a medium containing at least 95 mass % of water, followed by heating to a temperature of from 100 to 150° C. to subject the organic polymer to decomposition.
8. The method for producing hollow particles according to the above 7, wherein to the liquid containing spherical organic polymer-silicon compound composite particles, the liquid oxidizing agent is added in an amount of from 30 to 200 mL per 1 g of the spherical organic polymer-silicon compound composite particles contained in the liquid.
9. A method for producing hollow particles, which comprises treating the hollow particles obtained by the production method as defined in any one of the above 4 to 8 in hot water or pressurized hot water of from 80 to 200° C.
10. The method for producing hollow particles according to any one of the above 4 to 9, wherein the silicon compound is silica.
11. The method for producing hollow particles according to any one of the above 4 to 10, wherein the organic polymer is a homopolymer of one type or a copolymer of two or more types selected from the group consisting of styrene, a methacrylate and an acrylate.
12. Spherical organic polymer-silicon compound composite particles, which have a core comprising an organic polymer and a shell comprising a silicon compound, and have an average particle size of from 5 to 65 nm and an average roundness of at least 0.90.
13. The spherical organic polymer-silicon compound composite particles according to the above 12, wherein the organic polymer for the core has an average particle size of from 2 to 50 nm and an average roundness of at least 0.90.
14. The spherical organic polymer-silicon compound composite particles according to the above 12 or 13, wherein the silicon compound for the shell has a thickness of from 1 to 20 nm.
15. The spherical organic polymer-silicon compound composite particles according to any one of the above 12 to 14, wherein the silicon compound is silica.
16. The spherical organic polymer-silicon compound composite particles according to any one of the above 12 to 15, wherein the organic polymer is a homopolymer of one type or a copolymer of two or more types selected from the group consisting of styrene, a methacrylate and an acrylate.
17. A method for producing spherical organic polymer-silicon compound composite particles, which comprises adding a liquid containing organic polymer particles in a medium containing at least 70 mass % of an alcohol, to an alcohol solution of a silicon alkoxide to provide a silicon compound covering layer on the surface of the particles.
18. The method for producing spherical organic polymer-silicon compound composite particles according to the above 17, wherein after the spherical organic polymer-silicon compound composite particles are prepared, they are left at rest at a temperature of from 10 to 40° C. for from 1 to 7 days.
19. The method for producing spherical organic polymer-silicon compound composite particles according to the above 17 or 18, wherein the organic polymer is a homopolymer of one type or a copolymer of two or more types selected from the group consisting of styrene, a methacrylate and an acrylate.
20. A slurry containing from 5 to 40 mass % of the hollow particles as defined in any one of the above 1 to 3, wherein the total amount of the hollow particles and an organic solvent in the slurry is from 90 to 99.9 mass %, and the rest mainly comprises water.
21. The slurry according to the above 20, wherein the organic solvent is an alcohol which is liquid at 25° C. and/or a ketone which is liquid at 25° C.

Effects of the Invention

By using the spherical organic polymer-silicon compound composite particles of the present invention, a powder comprising fine hollow particles with a low degree of agglomeration, having a high roundness, and a slurry obtained by dispersing the hollow particles, can be obtained.

BEST MODE FOR CARRYING OUT THE INVENTION

The organic polymer suitable for the present invention is a polymer with which preparation of particles by emulsion polymerization is possible, and it may, for example, be a polystyrene, a polymethacrylate or a polyacrylate. The organic polymer may be a copolymer of two or more monomers selected from the group consisting of styrene, a methacrylate and an acrylate.

In general, in the emulsion polymerization, a polymer material such as styrene, a methacrylate or an acrylate and an emulsifier such as sodium dodecyl sulfate (SDS), dodecyl trimethylammonium chloride (C12TAC) or hexadecyl trimethylammonium bromide (C16TAB) are added to water, followed by stirring for emulsification, and the emulsion is heated while a nitrogen gas is blown to remove dissolved oxygen, and after the temperature reaches a predetermined temperature, a polymerization initiator such as potassium persulfate (KPS) or ammonium persulfate is added to initiate the polymerization. The particle size of the obtainable organic polymer particles is from several tens to several hundreds nanometer, and the size is adjusted mainly by the amount of the emulsifier and/or the organic monomers to water, and the larger the amount of the emulsifier and/or the smaller the amount of the organic monomer, the smaller the particles size.

In order that the organic polymer particles prepared as described above are easily covered with a silicon compound, it is preferred to carry out surface treatment on the organic polymer particles using a silane coupling agent. As the silane coupling agent, an epoxysilane coupling agent, a methacryloxysilane coupling agent, an aminosilane coupling agent or the like is used, and a methacryloxysilane coupling agent is particularly suitably used in a case where the organic polymer particles are made of a polystyrene, or an epoxysilane coupling agent in the case of a polymethacrylate or a polyacrylate. The surface modification is carried out by heating the emulsion containing the organic polymer to from 50 to 90° C., and adding a predetermined amount of the saline coupling agent, followed by stirring.

In the present invention, before the organic polymer particles are covered with a silicon compound, the medium in the emulsion containing the organic polymer particles is exchanged from water to a liquid containing at least 70 mass % of an alcohol. Heretofore, the medium of the emulsion containing the organic polymer particles has been water, but if covering with a silicon compound is carried out using the emulsion as it is, the core-shell composite particles (hereinafter sometimes referred to as organic polymer-silicon compound composite particles) to be formed are agglomerated. To avoid such agglomeration, the covering with silicon should be carried out at a solid content concentration of particles in the liquid of a very low concentration less than 1 mass %, whereby the productivity was remarkably poor. The present inventors have newly found that by changing the medium of the emulsion from water to a liquid containing at least 70 mass % of an alcohol, followed by covering with a silicon compound, core-shell composite particles can be formed without agglomeration even at a high solid content concentration of at least 1 mass %.

As a specific method to change the medium from water to a liquid containing at least 70 mass % of an alcohol, an ultrafiltration method may, for example, be mentioned. Particularly, a crossflow ultrafiltration method (tangential flow ultra-filtration) is suitable, in which the emulsion is made to pass while applying a pressure in the tangent direction of the surface of an ultrafiltration filter and at the same time, an alcohol is added to gradually change the medium. As the ultrafiltration filter, one made of a polyethersulfone or regenerated cellulose and having a molecular cutoff of from 30,000 to 100,000 (VIVAFLOW 200, manufactured by SARTORIUS K.K.), one made of polysulfone hollow fibers and having a molecular cutoff of from 10,000 to 500,000 (KrosFlo manufactured by SPECTRUM LABORATORIES, INC.) or one made of a ceramic and having a pore size of 20 nm (Membralox manufactured by Pall Corporation) or the like is suitably used. The alcohol for the change of the medium may, for example, be methanol, ethanol, normal propanol, isopropanol, normal butanol, isobutanol or tertiary butanol. Particularly, ethanol is suitably used.

In the emulsion of which the medium is changed to a liquid containing at least 70 mass % of an alcohol, the organic polymer particles are likely to agglomerate before the change and are thereby preferably dispersed. For example, in a case where the covering with a silicon compound is carried out in such a manner that an ammonia water or the like which is a hydrolysis catalyst for an alkoxysilane is preliminarily mixed with the emulsion after the change of the medium, and then the mixed liquid is dropwise added to an alcohol which is a solvent for the alkoxysilane, and then the alkoxysilane is dropwise added, a method may, for example, be mentioned wherein during the above operation, a container for a slurry containing the emulsion and the alcohol solvent is put in an ultrasonic chamber, and ultrasonic waves are continuously applied with stirring for dispersion.

The above alkoxysilane may, for example, be tetramethoxysilane, tetraethoxysilane, tetraisopropoxysilane or tetra-tert-butoxysilane. Among them, tetraethoxysilane is suitably used. The alcohol used as the solvent for the alkoxysilane may, for example, be methanol, ethanol, normal propanol, isopropanol, normal butanol, isobutanol or tertiary butanol. Particularly, isopropanol is suitably used. The temperature at which covering with a silicon compound is carried out is preferably from 10 to 50° C., more preferably from 10 to 40° C. The silicon compound in the present invention is silica ($SiO_2$) or one comprising silica as the main component and containing a small amount of silanol groups ($\equiv$Si-OH) and/or organic silicon groups ($\equiv$Si-OR and/or $\equiv$Si-R, wherein R is an organic group).

By continuing ultrasonic application with stirring the slurry for from several tens minutes to several hours even after completion of dropwise addition of the alkoxysilane, covering of the silicon compound is formed on the surface of the dispersed organic polymer particles. To obtain a stronger covering, aging is preferably carried out. Aging is carried out, for example, by leaving the slurry at rest at a temperature of from 10 to 40° C. for from 1 to 7 days.

From the core-shell composite particles after completion of the covering with the silicon compound, the organic polymer as the core is removed to produce hollow particles. In order that the core is decomposed without agglomeration of the core-shell composite particles, it is preferred to subject the organic polymer core to decomposition without drying the core-shell composite particles by using a liquid oxidizing agent. The most part of the medium for the core-shell composite particles after covering with silica is an alcohol, and if the slurry is heated in sulfuric acid as it is, the alcohol will be reacted with sulfuric acid, and such is unfavorable in the present invention. Therefore, it is preferred to change the alcohol to water before sulfuric acid is added. The change may be carried out by crossflow ultrafiltraiton, or may be carried out by subjecting the slurry to distillation or centrifugal separation to preliminarily remove the most part of the alcohol, followed by crossflow ultrafiltration. The medium is preferably changed to a liquid containing at least 90 mass %, preferably at least 95 mass % of water.

For the organic polymer of the core-shell composite particles having an outer shell comprising silica and an inner core comprising an organic polymer, a polystyrene, a polymethacrylate, a polyacrylate or the like, with which spherical particles can be polymerized in water, is suitably used. Such core-shell composite particles can be obtained by a common method of polymerizing styrene, a methacrylate, an acrylate or the like to form organic polymer particles, and covering the surface of the organic polymer particles with silica obtained by hydrolyzing an alkoxysilane such as tetrahydroxysilane. Further, the surface of commercially available organic polymer particles such as monodispersed polymer latex particles (tradename: MICROMER) manufactured by Corefront Corporation may be covered with silica obtained by hydrolyzing an alkoxysilane such as tetraethoxysilane.

In order to decompose the core-shell composite particles having an outer shell comprising silica and an inner core comprising an organic polymer without agglomeration, the organic polymer is subjected to oxidative decomposition by using a liquid oxidizing agent. However, if the above-described core-shell composite particles and an oxidizing agent such as nitric acid or perchloric acid are mixed and heated, a peroxide, a nitro compound or the like is formed in the most cases, and the organic polymer is not easily dissolved. The core of the organic polymer can be decomposed in a liquid by heating it in sulfuric acid at a concentration of preferably from 90 to 98 mass % to carbonize it first, and then by adding a liquid oxidizing agent such as nitric acid or hydrogen peroxide, followed by heating to decompose the carbon component. The amount of sulfuric acid used for carbonization varies depending on the type of the organic polymer in the interior, and in a case where sulfuric acid is used, it is preferably from 10 to 200 mL, more preferably from 10 to 100 mL per 1 g of a powder of the composite particles having an outer shell comprising silica and an inner core comprising an organic polymer. If it is at most 10 mL, carbonization by sulfuric acid tends to be insufficient, and if it is at least 200 mL, heating takes a long time, although such an amount is not problematic for decomposition.

The liquid oxidizing agent may, for example, be nitric acid, hydrogen peroxide or a chloric acid, and the chloric acid may, for example, be perchloric acid, chloric acid, chlorous acid or hypochlorous acid. Among them, it is preferred to use nitric acid and/or hydrogen peroxide. A solid oxidizing agent such as potassium permanganate is problematic in view of removal after the oxidizing treatment, and a gaseous oxidizing agent such as ozone is problematic such that the liquid may fly at the time of bubbling. The amount of the liquid oxidizing agent varies depending on the type and the concentration of the liquid oxidizing agent, etc., and in the case of a liquid oxidizing agent at a concentration of from 30 to 70 mass %, it is preferably from 30 mL to 200 mL, more preferably from 50 to 100 mL per 1 g of a powder of the core-shell composite particles having an outer shell comprising silica and an inner core comprising an organic polymer.

The temperature at which carbonization by sulfuric acid is carried out and the temperature at which the oxidizing treatment (carbide removing treatment) by the liquid oxidizing agent is carried out, are preferably from 200 to 300° C., more preferably from 200 to 280° C. If the temperature is lower than 200° C., the decomposition takes a long time, and if the temperature is too high, volatilization of sulfuric acid and the oxidizing agent tends to be remarkable. The heating method may be a gas burner, an electric heater, microwaves or the like and is not particularly limited, and heating by an electric heater or by microwaves is preferred in view of easiness of the temperature control. The initial carbonization treatment by sulfuric acid alone is preferably carried out for at least one hour after a white smoke of sulfuric acid mist starts to be emitted. If the carbonization treatment time is shorter than the above, carbonization of the organic polymer tends to be insufficient. The oxidizing treatment time after the liquid oxidizing agent is added varies depending on the oxidizing state, but it is preferred to carry out the oxidizing treatment until after completion of generation of nitric oxide in the case of nitric acid or oxygen in the case of a hydrogen peroxide solution, heating is further continued, and a white smoke of sulfuric acid mist starts to be emitted. Particularly, it is preferred to carry out heat treatment for at least 10 minutes after a white smoke of sulfuric acid mist starts to be emitted. By such heat treatment, the remaining organic polymer is carbonized by sulfuric acid. It is preferred to repeatedly carry out carbonization treatment by sulfuric acid and carbide removing treatment by the liquid oxidizing agent several times until the liquid becomes substantially transparent. If such operations are not carried out repeatedly, the organic polymer may remain in the interior of the silica particles in some cases.

The present inventors have newly found that removal of the core of the organic polymer by wet ashing is possible in a case where at least one liquid oxidizing agent selected from the group consisting of hydrogen peroxide, hypochlorous acid, chlorous acid, chloric acid and perchloric acid, and nitric acid, under predetermined conditions, instead of using the above sulfuric acid. The predetermined conditions are such that to an aqueous slurry containing core-shell composite particles having an outer shell comprising silica and an inner core comprising an organic polymer, nitric acid at a concentration of preferably from 60 to 70 mass % is added in an amount of preferably from 10 to 200 mL per 1 g of the core-shell composite particles, followed by heating preferably at from 100° C. to 150° C., and further, preferably from 30 to 200 mL of a liquid oxidizing agent at a concentration of preferably from 30 to 70 mass % is added. The order of addition of the liquid oxidizing agent and nitric acid may be reverse to the above, or they may be added simultaneously.

As the decomposed liquid after the organic polymer is removed contains sulfuric acid or nitric acid, distilled water is gradually added with cooling to dilute such an acid, and then hollow silica particles are collected by centrifugal separation or filtration. Since sulfuric acid or nitric acid and the liquid oxidizing agent remain in the interior of the hollow silica particles, washing with water is repeatedly carried out until the cleaning liquid becomes neutral. Particularly, it is preferred to carry out washing under heating in boiling water for about 1 hour. Further, as the case requires, it is possible to add a water soluble basic substance such as ammonia to accelerate neutralization.

The organic polymer to be decomposed by the wet ashing method as in the case of using nitric acid and a hydrogen peroxide solution or the case of using sulfuric acid and the liquid oxidizing agent, may, for example, be a polypropylene, a polyethylene, a polystyrene, a polyamide, a polyethylene terephthalate, a polymethacrylate or a polyacrylate. Among them, a polystyrene, a polymethacrylate or a polyacrylate is preferred.

By wet ashing the core-shell composite particles having the surface of the organic polymer particles covered with silica, hollow silica particles can be obtained.

Here, the hollow silica particles are particles having an air gap in the interior of the particles and having the surface covered with a covering film of silica.

The core-shell composite particles having an outer shell comprising silica and an inner core comprising an organic polymer are preferably such that when the core-shell composite particles are represented by a circle-equivalent radius R, the silica content is high at an outer portion which is a portion up to 30% from the surface rather than the inner portion which is a portion up to 70% from the center. If the silica content is high at the inner portion, no hollow silica particles will be obtained. Further, if the silica exists at a portion up to 50% or more from the surface, the air gap portion of the silica particles tends to be too small, and properties of the hollow silica particles such as a low refractive index and a low dielectric constant tend to be poor. Further, if the silica content is high at a portion up to 5% from the surface, when the composite particles are formed into hollow silica particles, the silica shell tends to be too thin and may be broken.

A powder of the core-shell composite particles is preferably produced by dispersing the silica component and the organic polymer in an alcohol and then separated from the alcohol. The core-shell composite particles in which the silica content is high at the outer portion of the organic polymer particles are obtained by reacting a hydrolyzate of an alkoxysilane such as tetraethoxysilane with the organic polymer particles, and since the alkoxysilane is not soluble in water, the reaction should be carried out in an alcohol such as ethanol in which both the alkoxysilane and water required for hydrolysis are soluble. Since the mixed medium contains unreacted alkoxysilane and the hydrolysis-accelerating catalyst such as ammonia, it is preferred to separate the core-shell composite particles without drying by a method such as centrifugal separation or filtration.

Sulfuric acid to be used to carbonize the core is added preferably after the powder of the core-shell composite particles is dispersed in water. The core-shell composite particles separated from the alcohol are put in a container for wet ashing, and it is preferred to re-disperse the core-shell composite particles separated by centrifugal separation or filtration before the wet ashing. In such a case, the solvent to be used for dispersion may, for example, be an alcohol or water and is not particularly limited so long as the core-shell composite particles are easily dispersed in it. Water is particularly preferred, which will not inhibit wet carbonization and ashing and is free from contamination.

The particles becoming hollow is confirmed by a transmission electron microscope. Further, the presence or absence of agglomeration can be confirmed by comparison of the average particle size as between before and after the hollow treatment. The average particle size can be measured by a conventional particle size measuring apparatus such as a laser diffraction method or a dynamic light scattering method. The value of the average particle size is the diameter unless otherwise specified.

The hollow silica particles after the core of the organic polymer is decomposed and removed by the method of the present invention, may be treated in hot water or pressurized hot water at a temperature of from 80 to 200° C., preferably from 100 to 200° C., so as to adjust the amount of silanol groups ($\equiv$Si-OH) on the particle surface and their state (either hydrogen bond type silanol groups or isolated silanol groups). In general, the higher the treatment temperature, the more the amount of the silanol groups is reduced, and the higher the proportion of the isolated silanol groups than the hydrogen bond type. The amount and the proportion of the silanol groups relate to the dispersibility of the hollow silica particles in various media and the reactivity with a silane coupling agent in a case where covering of the surface of the hollow silica particles with a silane coupling agent becomes necessary afterward.

The hollow particles of the present invention are particles having an outer shell and having a single hole (cavity) in their interior. The hollow particles have a low refractive index, a low dielectric constant and a high porosity and are thereby applicable to an antireflection material, a low dielectric constant material, a filler such as an insulating material, a carrier for drug delivery system, etc. For the most applications, it is required that the hollow particles are dispersed. With respect to a powder comprising hollow particles having a size (diameter) of from several to several tens nanometer, agglomeration is remarkable in a dry state and dispersed particles are hardly obtained, and accordingly the powder should be formed into a slurry with a relatively good dispersibility. Further, as the dispersion medium, an organic matrix is used in some cases, and in such a case, as the medium for the slurry, an organic solvent is suitable rather than water.

As a method for further improving the dispersibility of the hollow particles in the slurry, dispersion by a homogenizer or by a wet jet mill may be carried out. As the homogenizer apparatus, a stirring type (manufactured by MIZUHO INDUSTRIAL CO., LTD.), an ultrasonic type (manufactured by Branson Ultrasonics Div. Of Emerson Japan Ltd.) or the like may be used, and as a wet jet mill apparatus, Ultimizer or Star Burst (both manufactured by SUGINO MACHINE LIMITED), Nano Jet Pul (manufactured by JOKOH CO., LTD.), Nano Maker (manufactured by Advanced Nano Technology), Microfluidizer (manufactured by Microfluidics) or the like may be used.

As the method for improving the dispersibility of the hollow particles in the organic solvent, separately from the above dispersion, or in addition to the above dispersion, a method by the above hot water treatment and/or a method of covering the surface of the hollow particles with a silane coupling agent may be employed.

The slurry in which the hollow particles are dispersed in the organic solvent preferably has a content of the hollow particles of from 5 to 40 mass %, more preferably from 10 to 30 mass %. Further, the total amount of the hollow particles and the organic solvent in the slurry is preferably from 90 to 99.9 mass %, more preferably from 95 to 99.9 mass % of the entire slurry.

As the organic solvent for the slurry, an alcohol which is liquid at 25° C. which is the operating temperature such as methanol, ethanol, normal propanol, isopropanol, normal butanol, isobutanol or tertiary butanol, or a ketone which is liquid at 25° C. such as methyl ethyl ketone, diethyl ketone or methyl isobutyl ketone, is suitable.

The slurry which is a dispersion in an alcohol is obtained by changing the medium of an aqueous slurry containing the hollow particles obtained by washing with water after removal of the organic polymer, from water to an alcohol by means of a method such as crossflow ultrafiltration.

In such a case, in the case of a poor dispersed state, dispersion may be carried out by a wet jet mill. Further, treatment in hot water or pressurized hot water at a temperature of from 80 to 200° C. may be carried out to adjust the amount of the silanol groups ($\equiv$Si-OH) on the surface of the hollow particles or their state (either hydrogen bond type silanol groups or isolated silanol groups).

The slurry which is a dispersion in a ketone can be obtained by subjecting the above obtained slurry which is a dispersion in an alcohol to dispersion by a wet jet mill as the case requires, and covering the surface of the hollow particles with a silane coupling agent, and changing the medium from the alcohol to a ketone by a method such as crossflow ultrafiltration.

In the method for improving dispersibility of the hollow particles in an organic solvent, as the silane coupling agent to cover the surface of the hollow particles, an epoxysilane coupling agent, a methacryloxysilane coupling agent or the like is suitably used.

The average particle size of the organic polymer particles to be the core of the core-shell composite particles, the spherical organic polymer-silicon compound composite particles and the hollow particles can be measured by a transmission electron microscope or by a particle size measuring apparatus by means of a dynamic light scattering method.

In the present invention, the average particle size by the dynamic light scattering method is likely to fluctuate by the influence of the concentration of the particles or the hollow particles, the viscosity, or the medium composition of the slurry to be subjected to measurement. Accordingly, diameters of 100 or more particle images obtained by a transmission electron microscope were measured, and their average was regarded as the average particle size. Here, as the diameter of a particle of which the particle image is not circular, in the case of an ellipse, the geometrical mean of the major axis and the minor axis is regarded as the diameter of the particle, and in the case of an irregular shape other than a circle or an ellipse, the geometrical mean of the longest size and the shortest size is regarded as the diameter of the particle.

The presence or absence of the hollow, and the thickness of the shell of the spherical organic polymer-silicon compound composite particles (core-shell composite particles) or the hollow particles is confirmed by a transmission electron microscope.

The presence or absence of agglomeration is confirmed by comparison of the particle size by a dynamic light scattering method measured under the same conditions of the solid content concentration, the medium composition, the measurement temperature, etc. The particle size is represented by the diameter unless otherwise specified.

The average roundness can be measured by bringing the particle image by a transmission electron microscope in an image analyzer (for example, manufactured by Nippon Avionics Co., Ltd.) as it is. In a case where it is difficult to directly bring in the particle image, a copy having the outline of the particle image copied on paper is brought in to measure the average roundness. That is, the project area (A) and the peripheral length (PM) of a particle are measured from the particle image. When the area of a circle corresponding to the peripheral length (PM) is represented by (B), the roundness of the particle can be represented as A/B. Assuming a circle having the same peripheral length as the peripheral length (PM) of the sample particle, since $PM=2\pi r^2$ and $B=\pi r^2$, $B=\pi \times (PM/2\pi)^2$, and the roundness of each particle can be calculated as the roundness=$A/B=A \times 4\pi/(PM)^2$.

In the present invention, the roundnesses of 100 or more particles were measured, and the average was regarded as the average roundness.

EXAMPLES

Now, the present invention will be described in further detail with reference to Examples and Comparative Examples. However, the present invention is by no means restricted to the following Examples.

Example 1

Into a separable flask having a capacity of 300 mL, 200 mL of distilled water and 1 g of sodium dodecyl sulfate (SDS) were added, followed by stirring while a nitrogen gas was bubbled. After a lapse of 30 minutes while bubbling and stirring were continued, 20 g of styrene was added, and heating was started. When the water temperature reached 80° C., bubbling was terminated, and 0.4 g of potassium persulfate (KPS) dissolved in 10 mL of distilled water was added. The mixture was held at 80° C. for 20 minutes while stirring was continued, 1.5 g of methacryloxypropyltrimethoxysilane (silane coupling agent) was added, and the mixture was held at 70° C. for 3 hours while stirring was continued.

600 mL of ethanol was added to 200 mL of the obtained emulsion, crossflow ultrafiltration was carried out using an ultrafiltration filter (made of polyether sulfone, molecular cutoff: 30,000, manufactured by SARTORIUS K.K., VIVA-FLOW 200), the filtrate was discharged until the amount of the emulsion became 200 mL for concentration. 600 mL of ethanol was further added, and the emulsion was concentrated to 200 mL by the same operation. After such operations were carried out, the concentration of ethanol in the emulsion was measured by means of gas chromatography and by a mass spectrometer, whereupon it was 85.3 mass %.

After part of the emulsion was dried, optional 100 particle images were selected from a photograph of particle images enlarged by a transmission electron microscope, and their diameters were measured to calculate the average particle size, whereupon it was 35 nm. The average roundness of particles measured by an image analyzer (manufactured by Nippon Avionics Co., Ltd.) using a copy having outlines of such particle images copied on paper, was 0.96. Further, the change in the average particle size as between before and after the medium was changed from water to an alcohol was measured by a dynamic light scattering apparatus (LB-550 manufactured by HORIBA, Ltd.), whereupon it was +2 nm ("+" means an increase, and "−" means a decrease, the same applies hereinafter), and no remarkable agglomeration of particles by the change occurred.

The emulsion after the change was cooled to 25° C., and 150 mL thereof was sampled, 25 mL of ammonia water at a concentration of 30 mass % was added, and the mixture was gradually added to 3 L of isopropanol held at 25° C. with stirring. On that occasion, ultrasonic vibration was applied to a container in which the isopropanol was put to accelerate dispersion of the emulsion. While application of ultrasonic vibration was continued, 120 mL of tetraethoxysilane was gradually dropwise added, thereby to cover polystyrene particles in the emulsion with a silicon compound containing as the main component silica which was a hydrolyzate of tetraethoxysilane. 10 Minutes after completion of the dropwise addition of tetraethoxysilane, application of ultrasonic vibration was terminated, a lid was put on the container, and the container was left at rest at 25° C. for 2 days to carry out aging of the covering with the silicon compound thereby to prepare spherical organic polymer (styrene)-silicon compound composite particles (hereinafter sometimes referred to as core-shell composite particles).

After part of the liquid containing the composite particles was dried, optional 100 particle images were selected from a photograph of particle images enlarged by a transmission electron microscope and their diameters were measured to calculate the average particle size, whereupon it was 48 nm. The value (6 nm) obtained by subtracting the average particle size (35 nm) of the organic polymer particles as the core before covering observed by a transmission electron microscope from the above calculated average particle size, and dividing the resulting value by 2, was regarded as the thickness of the silicon compound covering layer (shell). The average roundness of particles measured by an image analyzer using a copy having outlines of such particle images copied on paper was 0.96. Further, the change in the average particle size as between before and after covering with the silicon compound was measured by a dynamic light scattering apparatus, whereupon it was +13 nm, which substantially corresponds to an increase in the diameter by the shell covering (the above difference between 48 nm and 35 nm), and no remarkable agglomeration of particles by covering occurred.

About 3 L of the liquid containing the core-shell composite particles after aging was subjected to distillation by a rotary evaporator and concentrated to about 400 mL. Then, such an operation that 1,200 mL of distilled water was added, crossflow ultrafiltration was carried out, and the liquid was concentrated to about 400 mL, was repeatedly carried out twice, to change the medium of the liquid to water. The concentration of the core-shell composite particles determined from the weight of a residue obtained by weighing 1 g of the liquid and evaporating it to dryness, was 6 mass %, and it was found that about 25 g of the core-shell composite particles were contained in 400 mL of the liquid. 600 mL (24 mL per 1 g of the core-shell composite particles) of 96 mass % of sulfuric acid was gradually added.

Then, the sulfuric acid solution was heated by an infrared heater set at 270° C. and heated for 1 hour in a state where a white smoke of sulfuric acid mist was emitted. Carbonization of the organic polymer was confirmed by the change of the liquid color from white to black. The liquid was air-cooled and when the liquid temperature was decreased to 80° C., 200 mL of a hydrogen peroxide solution (concentration: 30 mass %) was added, and the liquid was heated again by an infrared heater set at 270° C. Hydrogen peroxide was decomposed to generate oxygen ($2H_2O_2 \rightarrow 2H_2O+O_2$), which oxidized the carbon component, and accordingly the liquid color changed from black to yellow. The liquid was heated again by an infrared heater to a state where sulfuric acid mist was emitted, whereby the remaining organic polymer was carbonized, and the liquid color changed again to brown.

After the liquid was air-cooled, 200 mL of a hydrogen peroxide solution was further added, and the liquid was heated again at 270° C. This operation was repeatedly carried out (10 times) after the liquid color changed to white. From the final state where sulfuric acid mist was emitted, the liquid was cooled to 25° C., the solid content was precipitated by using a centrifugal separator (manufactured by KUBOTA Manufacturing Corporation) and the supernatant (sulfuric acid) was removed, and distilled water in an amount of 10 times by volume of the solid content was added, followed by stirring, and centrifugal sedimentation was carried out again. Such operations were repeatedly carried out 10 times, whereby the pH of the supernatant liquid changed from 0 to 4. The precipitate was white.

After part of the precipitate was dried, optional 100 particle images were selected from a photograph of particle images enlarged by a transmission electron microscope and their diameters were measured to calculate the average particle size, whereupon it was 51 nm. The thicknesses of the shells of such particles were directly measured on the photograph to determine the average, whereupon it was 7 nm. Further, the average roundness of particles measured by an image analyzer using a copy having outlines of such particle images copied on paper was 0.95.

Since the precipitate was loosely agglomerated by centrifugal separation, it was diluted with distilled water to obtain an aqueous slurry containing 10 mass % of the hollow particles as the solid content, followed by dispersion by a wet jet mill (Star Burst manufactured by SUGINO MACHINE LIMITED) under a discharge pressure of 245 MPa. The average particle size after dispersion was measured by a dynamic light scattering apparatus and compared with the average particle size of the composite particles before removal of the core, whereupon the change was +3 nm, and no remarkable agglomeration of particles by removal of the core occurred.

The above production conditions are shown in Table 1, and the evaluation results are shown in Table 2.

Examples 2 to 7 and Comparative Examples 1 and 2

Hollow particles were prepared and evaluated in the same manner as in Example 1 except that starting materials used and some conditions were changed. The production conditions are shown in Table 1, and the evaluation results are shown in Table 2.

The material used as abbreviated in Table 1 are shown below.
MMA: Methyl Methacrylate
SDS: Sodium Dodecyl Sulfate
C12TAC: (n-)Dodecyl Trimethylammonium Chloride
C16TAB: (n-)Hexadecyl Trimethylammonium Bromide
KPS: Potassium Persulfate
APS: Ammonium Persulfate
MPS: (3-)Methacryloxypropyl Trimethoxysilane
GPS: (3-)Glycidoxypropyl Trimethoxysilane
EtOH: Ethanol
MeOH: Methanol
IPA: Isopropanol
TEOS: Tetraethoxysilane
TMOS: Tetramethoxysilane

TABLE 1

| | Core formation | | | | | | |
|---|---|---|---|---|---|---|---|
| | Organic monomer | Surfactant | Polymerization initiator | Silane coupling agent | Temp. | Time | Type and concentration of alcohol (mass %) |
| Ex. 1 | Styrene 20 g | SDS 1.5 g | KPS 0.4 g | MPS 1.5 g | ①80° C. ②70° C. | ③20 min ④3 hr. | EtOH 85.3% |
| Ex. 2 | Styrene 10 g | C12TAC 2.0 g | KPS 0.2 g | MPS 1.5 g | ①80° C. ②70° C. | ③20 min ④3 hr. | MeOH 82.5% |
| Ex. 3 | Styrene 30 g | C16TAB 1.5 g | KPS 0.6 g | MPS 2.0 g | ①80° C. ②70° C. | ③20 min ④3 hr. | EtOH 74.5% |
| Ex. 4 | MMA 19 g | SDS 1.5 g | APS 0.3 g | GPS 2.0 g | ①80° C. ②80° C. | ③20 min ④2 hr. | EtOH 72.1% |
| Ex. 5 | Styrene 10 g MMA 10 g | C12TAC 2.0 g | KPS 0.4 g | GPS 2.0 g | ①80° C. ②80° C. | ③20 min ④2 hr. | EtOH 78.9% |
| Ex. 6 | Styrene 20 g | SDS 15.0 g | KPS 0.4 g | MPS 8.0 g | ①80° C. ②70° C. | ③20 min ④3 hr. | EtOH 84.9% |
| Ex. 7 | Styrene 20 g | SDS 1.5 g | KPS 0.4 g | MPS 4.0 g | ①70° C. ②70° C. | ③30 min ④3 hr. | EtOH 84.9% |
| Ex. 8 | Styrene 20 g | SDS 1.5 g | KPS 0.4 g | MPS 1.5 g | ①80° C. ②70° C. | ③20 min ④3 hr. | EtOH 83.6% |
| Comp. Ex. 1 | Styrene 20 g | SDS 1.5 g | KPS 0.4 g | MPS 1.5 g | ①80° C. ②70° C. | ③20 min ④3 hr. | Nil (distilled water) |
| Comp. Ex. 2 | Styrene 20 g | SDS 1.5 g | KPS 0.4 g | MPS 1.5 g | ①80° C. ②70° C. | ③20 min ④3 hr. | EtOH 65.2% |
| Comp. Ex. 3 | Styrene 20 g | SDS 1.5 g | KPS 0.4 g | MPS 1.5 g | ①80° C. ②70° C. | ③20 min ④3 hr. | EtOH 85.3% |

| | Core aging | | | | Core removal | |
|---|---|---|---|---|---|---|
| | Ammonia water (30 mass %) | Alcohol | Silicon alkoxide | Aging | Acid | Hydrogen peroxide solution (30 mass %) | Temp. |
| Ex. 1 | 25 mL | IPA 3 L | TEOS 120 mL | 25° C. × 2 days | Sulfuric acid 600 mL | 200 mL × 10 times | ⑤270° C. ⑥80° C. |
| Ex. 2 | 25 mL | MeOH 3 L | TMOS 40 mL | 25° C. × 1 day | Sulfuric acid 600 mL | 200 mL × 10 times | ⑤270° C. ⑥80° C. |

TABLE 1-continued

| | | | | | | | |
|---|---|---|---|---|---|---|---|
| Ex. 3 | 25 mL | EtOH 3 L | TEOS 180 mL | 25° C. × 4 days | Sulfuric acid 600 mL | 200 mL × 10 times | ⑤300° C.* ⑥80° C. |
| Ex. 4 | 25 mL | IPA 3 L | TEOS 120 mL | 25° C. × 2 days | Sulfuric acid 600 mL | 200 mL × 10 times | ⑤230° C. ⑥80° C. |
| Ex. 5 | 25 mL | IPA 3 L | TEOS 120 mL | 25° C. × 2 days | Sulfuric acid 600 mL | 200 mL × 10 times | ⑤250° C. ⑥80° C. |
| Ex. 6 | 25 mL | IPA 3 L | TEOS 120 mL | 25° C. × 2 days | Sulfuric acid 600 mL | 200 mL × 10 times | ⑤270° C. ⑥80° C. |
| Ex. 7 | 25 mL | IPA 3 L | TEOS 120 mL | 25° C. × 2 days | Sulfuric acid 600 mL | 200 mL × 10 times | ⑤270° C. ⑥80° C. |
| Ex. 8 | 25 mL | IPA 3 L | TEOS 120 mL | 25° C. × 2 days | Nitric acid 1000 mL | 200 mL × 10 times | ⑤150° C. ⑥80° C. |
| Comp. Ex. 1 | 25 mL | IPA 3 L | TEOS 120 mL | 25° C. × 2 days | Sulfuric acid 600 mL | 200 mL × 10 times | ⑤230° C. ⑥80° C. |
| Comp. Ex. 2 | 25 mL | IPA 3 L | TEOS 120 mL | 25° C. × 2 days | Sulfuric acid 600 mL | 200 mL × 10 times | ⑤250° C. ⑥80° C. |
| Comp. Ex. 3 | 25 mL | IPA 3 L | TEOS 120 mL | 25° C. × 2 days | NaCl was added to aqueous slurry obtained in Ex. 1, followed by spray drying at 200° C. → heating at 600° C. × 1 hr. | | |

*Example 3: Heating in sulfuric acid for core removal was carried out by microwave heating (µ Reactor manufactured by Shikoku Instrumentation Co., Ltd.)
①Emulsion polymerization temperature
②Silane coupling agent treatment temperature
③Emulsion polymerization time
④Silane coupling agent treatment time
⑤Acid treatment temperature
⑥Hydrogen peroxide treatment temperature

TABLE 2

| | Organic polymer particles | | | Composite particles | | | | Hollow particles | | | |
|---|---|---|---|---|---|---|---|---|---|---|---|
| | Average particle size (nm) | Average roundness | Change in average particle size as between before and after the change of the solvent (nm) | Average particle size (nm) | Shell thickness (nm) | Average roundness | Change in average particle size as between before and after the shell covering (nm) | Average particle size (nm) | Shell thickness (nm) | Average roundness | Change in average particle size as between before and after the core removal (nm) |
| Ex. 1 | 35 | 0.96 | +2 | 48 | 6 | 0.96 | +13 | 51 | 7 | 0.95 | +3 |
| Ex. 2 | 15 | 0.90 | +2 | 22 | 3 | 0.91 | +7 | 24 | 3 | 0.90 | +2 |
| Ex. 3 | 42 | 0.98 | +2 | 62 | 11 | 0.97 | +23 | 63 | 12 | 0.97 | 0 |
| Ex. 4 | 20 | 0.91 | +4 | 42 | 12 | 0.95 | +24 | 40 | 10 | 0.94 | −2 |
| Ex. 5 | 22 | 0.93 | +4 | 53 | 16 | 0.96 | +32 | 52 | 16 | 0.95 | −1 |
| Ex. 6 | 4 | 0.90 | 0 | 8 | 2 | 0.90 | +4 | 8 | 2 | 0.91 | 0 |
| Ex. 7 | 36 | 0.93 | +4 | 54 | 9 | 0.94 | +17 | 52 | 9 | 0.93 | −3 |
| Ex. 8 | 38 | 0.94 | +3 | 52 | 5 | 0.95 | +12 | 55 | 6 | 0.94 | +2 |
| Comp. Ex. 1 | 37 | 0.96 | —* | 120** | 7 | 0.56 | +90 | 125** | 8 | 0.54 | +5 |
| Comp. Ex. 2 | 35 | 0.95 | +2 | 105** | 7 | 0.71 | +16 | 95** | 8 | 0.73 | −12 |
| Comp. Ex. 3 | 35 | 0.96 | +2 | 48 | 6 | 0.96 | +13 | 264** | 9 | 0.67 | +205 |

*For the organic polymer particles in Comparative Example 1, no change of the solvent was carried out, and thus there is no change in the average particle size as between before and after the change.
**There are a large amount of agglomerated particles. Of the agglomerated particles, the geometrical mean of the longest size and the shortest size was regarded as the particle size.

Example 8

Spherical organic polymer-silicon compound composite particles wherein the organic polymer was polystyrene were prepared in the same manner as in Example 1, whereupon the average particle size was 52 nm, the thickness of the silicon compound covering layer (shell) was 5 nm, the average roundness of the particles was 0.95, and the change in the average particle size as between before and after covering with the silicon compound was +12 nm. Further, in the same manner as in Example 1, the medium of the liquid was changed to water to prepare a liquid containing about 20 g of core-shell composite particles in 200 mL. 1,000 mL (50 mL per 1 g of the composite particles) of nitric acid having a concentration of 70% was gradually added to the liquid. Then, the liquid was heated by an infrared heater set at 150° C. and heated for 1 hour in a state where $NO_2$ (brown gas) was emitted. Partial decomposition of the organic polymer was confirmed by the change of the liquid color from white to brown.

The liquid was air cooled and when the liquid temperature was decreased to 80° C., 200 mL of a hydrogen peroxide solution (concentration: 30 mass %) was added, and the liquid was heated again by an infrared heater set at 150° C. Hydrogen peroxide was decomposed to generate oxygen ($2H_2O_2 \rightarrow 2H_2O + O_2$), which accelerated oxidation, and accordingly the liquid color changed from brown to yellow. The liquid was heated again by an infrared heater to a state where $NO_2$ was emitted, whereupon the remaining undecomposed organic polymer was subjected to decomposition, whereby the liquid color changed to brown again. After the liquid was air cooled, 200 mL of a hydrogen peroxide solution was further added, and the liquid was heated again at 150° C. These operations were repeatedly carried out (20 times) until the liquid color became white. From the final state where $NO_2$ was emitted, the liquid was cooled to 25° C., and the same operation as in Example 1 was carried out by using a centrifugal separator (manufactured by KUBOTA Manufacturing Corporation), and the obtained precipitate was white.

Then, in the same manner as in Example 1, the average particle size of the hollow particles, the shell thickness and the average roundness of the particles were measured. The average particle size was 55 nm, the average of the thicknesses of the shells of the particles was 6 nm, and the average roundness was 0.94.

The precipitate was diluted with distilled water to obtain an aqueous slurry having a solid content of 10 mass %, followed by dispersion by a wet jet mill under a discharge pressure of 200 MPa. The average particle size after the dispersion was measured by a dynamic light scattering apparatus and compared with the average particle size of the core-shell composite particles before the core removal, whereupon the change was +2 nm, and no remarkable agglomeration of particles by the removal of the core occurred. The production conditions of the above operations are shown in Table 1, and the evaluation results are shown in Table 2.

Comparative Example 3

The medium of the liquid containing the core-shell composite particles after the aging obtained in Example 1 was changed to distilled water, and then a liquid containing about 20 g of the composite particles in 200 mL of the medium was prepared. 20 mL thereof was sampled and diluted to 10 times with distilled water to obtain a liquid containing 2 g of the core-shell composite particles in 200 mL. To the liquid, no treatment using a liquid oxidizing agent of the present invention was carried out and instead, 20 g of sodium chloride (NaCl) was added, followed by stirring at 25° C. One hour later, complete dissolution of NaCl was confirmed, stirring was terminated, and the liquid was subjected to spray drying at 200° C. using a spray dryer (B-290 manufactured by Buchi). A powder after drying was heated in the air at 600° C. for 1 hour to decompose and remove the organic polymer for the core, and after cooling, it was dispersed in 200 mL of distilled water. The operation of carrying out centrifugal sedimentation to remove the supernatant liquid and dispersing the precipitate in 200 mL of distilled water again, was repeatedly carried out five times, and the precipitate was washed.

Then, part of the precipitate was dried, and from a photograph of particle images enlarged by a transmission electron microscope, agglomeration of the prepared hollow particles was confirmed. Further, optional 100 particle images were selected and their diameters were measured to calculate the average particle size, whereupon it was 264 nm. Many of the particle images of the agglomerated hollow particles had irregular shapes, not circular or elliptic, and with respect to such irregular particles, the geometrical mean of the longest size and the shortest size of each particle was regarded as the diameter of the particle. The thicknesses of the shells of such hollow particles were directly measured on the photograph to determine the average, whereupon it was 9 nm.

Further, the average roundness of the hollow particles measured by an image analyzer using a copy having outlines of such particle images copied on paper was 0.67. The rest of the precipitate was diluted with distilled water to obtain an aqueous slurry containing 1 mass % of hollow particles as the solid content, followed by dispersion by a wet jet mill under a discharge pressure of 245 MPa. The average particle size after the dispersion was measured by a dynamic light scattering apparatus and compared with the average particle size of the core-shell composite particles before the core removal, whereupon the change was +205 nm, and the particles were agglomerated by the removal of the core. The production conditions of the above operations are shown in Table 1, and the evaluation results are shown in Table 2.

Example 9

The dispersion of the aqueous slurry obtained in Example 1 was put in an autoclave and subjected to pressurized hot water treatment under a pressure of 1 MPa at a temperature of 180° C. for 1 hour. After cooling, dispersion was carried out by an ultrasonic homogenizer (450D manufactured by Branson Ultrasonics Division of Emerson Japan, Ltd.). After the dispersion, part of the slurry was dried, and optional 100 particle images were selected from a photograph of particle images enlarged by a transmission electron microscope and their diameters were measured to calculate the average particle size, whereupon it was 50 nm. The thicknesses of the shells of such hollow particles were directly measured on the photograph to determine the average value, whereupon it was 6 nm. Further, the average roundness of the hollow particles measured by an image analyzer using a copy having outlines of such particle images copied on paper was 0.94. The average particle size was measured by a dynamic light scattering apparatus and compared with the average particle size of the hollow particles before the pressurized hot water treatment, whereupon the change was −1 nm and no remarkable aggregation of particles by the pressurized hot water treatment occurred.

Example 10

The slurry after dispersion in Example 9 was subjected to crossflow ultrafiltration, and the medium was changed from water to isopropanol to obtain a slurry containing 15 mass % of hollow particles as the solid content. The moisture content in the slurry was measured by a Karl Fischer method, and the rest obtained by subtracting the moisture content from 100 mass % was regarded as the total amount of the hollow particles and the organic solvent, whereupon the total amount was 91.5 mass %. The slurry was subjected to dispersion by a wet jet mill under a discharge pressure of 200 MPa. Part of the slurry after the dispersion was dried, and optional 100 particle images were selected from a photograph of particle images enlarged by a transmission electron microscope and their diameters were measured to calculate the average particle size, whereupon it was 52 nm. The thicknesses of the shells of such hollow particles were directly measured on the photograph to determine the average value, whereupon it was 6 nm.

Further, the average roundness of particles measured by an image analyzer using a copy having outlines of such particle images copied on paper was 0.93. The average particle size was measured by a dynamic light scattering apparatus and compared with the average particle size of the hollow particles immediately before the medium was changed to isopropanol, whereupon the change was +2 nm, and no remarkable agglomeration of particles by the change of the medium occurred.

Example 11

200 g of the slurry (containing 15 mass % of the hollow particles) after the change to isopropanol/dispersion obtained in Example 10 was weighed and put in a separable flask, followed by stirring by a magnetic stirrer. Then, methacryloxypropyl trimethoxysilane (silane coupling agent) was added in an amount (3.0 g) corresponding to one-tenth of the mass of the hollow particles, and the mixture was heated with stirring in a water bath and held at 70° C. for 3 hours. After cooling, 10 g of the slurry was weighed and subjected to centrifugal sedimentation to obtain a precipitate. Operations of adding 8.5 g of isopropanol, followed by stirring, and carrying out centrifugal sedimentation to obtain a precipitate, was repeatedly carried out five times, and the precipitate was washed.

Then, the precipitate was vacuum-dried at 25° C. for 1 day and subjected to gas chromatography mass spectrometry (GC/MS), whereupon methacrylic acid derived from the silane coupling agent was detected, and it was found that the hollow particles were covered with the silane coupling agent. The rest of the slurry was subjected to dispersion by an ultrasonic homogenizer. Part of the slurry after the dispersion was dried, and optional 100 particle images were selected from a photograph of particle images enlarged by a transmission electron microscope and their diameters were measured to calculate the average particle size, whereupon it was 56 nm. The thicknesses of the shells of such particles were directly measured on the photograph to determine the average, whereupon it was 7 nm.

Further, the average roundness of particles measured by an image analyzer using a copy having outlines of such particle images copied on paper was 0.95. The average particle size was measured by a dynamic light scattering apparatus and compared with the average particle size of the hollow particles before the treatment with the silane coupling agent, whereupon the change was +3 nm, and no remarkable agglomeration of particles by the treatment with the silane coupling agent occurred.

Example 12

100 g of the slurry after covering with the silane coupling agent/dispersion obtained in Example 11 was weighed and put in an eggplant flask. 1 kg of methyl isobutyl ketone was added, followed by distillation by a rotary evaporator in a water bath at 85° C. to change the medium. When the amount of the residue became 100 g, heating was terminated, and the temperature was decreased to 25° C. to obtain a slurry. The moisture content of the slurry was measured by a Karl Fischer method, and the rest obtained by subtracting the moisture content from 100 mass % was regarded as the total amount of the hollow particles and the organic solvent, whereupon the total amount was 99.3 mass %. Further, the contents of methyl isobutyl ketone and isopropanol were analyzed by gas chromatography mass spectrometry (GC/MS), whereupon they were 76 mass % and 7 mass %, respectively.

Then, the slurry was subjected to dispersion by an ultrasonic homogenizer. Part of the slurry after the dispersion was dried, and optional 100 particle images were selected from a photograph of particle images enlarged by a transmission electron microscope and their diameters were measured to calculate the average particle size, whereupon it was 55 nm. The thicknesses of the shells of such particles were directly measured on the photograph to obtain the average, whereupon it was 7 nm. Further, the average roundness of particles measured by an image analyzer using a copy having outlines of such particle images copied on paper was 0.95. The average particle size was measured by a dynamic light scattering apparatus and compared with the average particle size of the hollow particles before the change of the medium, whereupon the change was −1 nm, and no remarkable agglomeration of particles by the change of the medium occurred.

Comparative Example 4

In the same manner as in the method disclosed in Example 2 of Patent Document 1 (JP-A-2001-233611), using $SiO_2 \cdot Al_2O_3$ as the core, a first silica covering layer was formed on the core by using a silicic acid solution, the core was removed by a hydrochloric acid aqueous solution, and further, a second silica covering layer was formed by using tetraethoxysilane (ethyl silicate) to prepare hollow silica particles, and further, the medium was changed to ethanol to obtain a slurry having a solid content concentration of 20 mass %. Using a powder obtained by drying part of the slurry, optional 100 particle images were selected from a photograph of particle images enlarged by a transmission electron microscope, and their diameters were measured.

Here, the hollow silica particles comprised spherical particles and elliptic spherical particles. As the diameter of the elliptic spherical particles, the geometrical mean of the major axis and the minor axis [$\{(\text{major axis}) \times (\text{minor axis})\}^{1/2}$] was employed. The calculated average particle size was 50 nm. The thicknesses of the shells of such hollow silica particles were directly measured on the photograph to determine the average, whereupon it was 10 nm. Further, the average roundness of the hollow silica particles measured by an image analyzer using a copy having outlines of such particle images copied on paper was 0.88.

Example 13

Core-shell composite particles having an outer shell comprising silica and an inner core comprising an organic polymer were prepared in accordance with literature [Chemical Materials Vol. 14, No. 3, p. 1325 (2002)]. That is, 10 g of styrene (manufactured by KANTO CHEMICAL CO., INC., Cica first grade), 0.1 g of potassium peroxodisulfate (manufactured by KANTO CHEMICAL CO., INC., special grade) as a polymerization initiator and 0.1 g of dodecyldimethylpropylammonium sulfate (manufactured by SIGMA) as a surfactant were added to 100 g of distilled water, followed by reflux at 70° C. for 12 hours. Further, 1 g of 3-trimethoxysilylpropyl methacrylate (manufactured by AROSE ORGANICS) as a surface treating agent for polystyrene, 0.1 g of ammonium phosphate dibasic (manufactured by KANTO CHEMICAL CO., INC., special grade) as a buffer and 0.1 g of ammonium hydrogencarbonate (manufactured by KANTO CHEMICAL CO., INC., Cica special grade) were added, followed by reflux again at 70° C. for 5 hours to obtain a dispersion of polystyrene particles.

Then, 10 mL of the above dispersion of the polystyrene particles and 2.3 g of a 30 mass % ammonium water (manufactured by KANTO CHEMICAL CO., INC., special grade) were added to 100 mL of ethanol (manufactured by KANTO CHEMICAL CO., INC., special grade), and to the resulting liquid, a mixed solution of 7 g of tetraethoxysilane (manufactured by KANTO CHEMICAL CO., INC., for organic synthesis) and 7 g of ethanol was dropwise added, followed by stirring for 12 hours to obtain core-shell composite particles having an outer shell comprising silica and an inner core comprising a polystyrene dispersed in an alcohol (solid content concentration: about 3 g/100 mL). Further, by centrifugal separation, the core-shell composite particles were collected and washed with water, and such operations were repeatedly carried out to obtain core-shell composite particles dispersed in water (solid content concentration: about 3 g/100 mL).

0.1 g of the core-shell composite particles was diluted with 50 mL of water, followed by dispersion treatment by an ultrasonic cleaner for 30 minutes, and the average particle size (harmonic average particle size based on the scattered light intensity) defined in accordance with "Particle size analysis-Photon correlation spectroscopy" of JIS Z 8826: 2005 by a dynamic light scattering method (Zetasizer Nano-ZS manufactured by Malvern Instruments Ltd., soft used: Dispersion Technology Software 4.20) was measured (measurement temperature: 25° C.), whereupon the average particle size was 205 nm. In the core-shell composite particles, silica existed at the outer portion with a thickness of from 10 to 30 nm. This means that by the circle-equivalent radius R of the composite particles, silica exist at a portion of from 10 to 29% from the surface.

Example 14

20 mL of concentrated sulfuric acid (manufactured by KANTO CHEMICAL CO., INC., EL grade, concentration: 96 mass %) was added to 5 mL (0.15 g as the solid content) of the dispersion of the core-shell composite particles dispersed in water obtained by the method in Example 13, and heated in a sand bath set at 270° C. for 1 hour in a state where a white smoke of sulfuric acid mist was emitted. As the organic polymer was carbonized, the liquid color was changed from white to black. After air cooling, 2 mL of a hydrogen peroxide solution (manufactured by KANTO CHEMICAL CO., INC., special grade, concentration: 30 mass %) was added, followed by heating in a sand bath at 270° C. again. Hydrogen peroxide was decomposed to generate oxygen ($2H_2O_2 \rightarrow 2H_2O + O_2$), which oxidized the carbon component, and accordingly the liquid color changed from black to yellow.

Further, the liquid was heated in a sand bath at 270° C. in a state where sulfuric acid mist was emitted, whereby the remaining organic polymer was carbonized, and thus the liquid color changed to brown again. After air cooling, 2 mL of a hydrogen peroxide solution (manufactured by KANTO CHEMICAL CO., INC., special grade, concentration: 30 mass %) was added, followed by heating in a sand bath at 270° C. again. Such operations were repeatedly carried out (10 times) until the liquid color became transparent. Then, the liquid was diluted to 100 mL with deionized water, and particles were collected by centrifugal separation. The particles were washed with water, and then the particles were collected by centrifugal separation again. Such operations were repeatedly carried out three times, whereby the supernatant liquid became neutral. The precipitate was white.

The precipitate was dried and observed by a transmission electron microscope (manufactured by JEOL Ltd., JEM-2000FX2), whereupon the precipitate was hollow silica particles. Further, 0.1 g of the particles collected by centrifugal separation without being dried were diluted with 50 mL of water and subjected to dispersion treatment by an ultrasonic cleaner for 30 minutes, and the average particle size was measured by a dynamic light scattering method, whereupon the average particle size of the hollow silica particles was 200 nm. The proportion of the average particle size (200 nm) of the hollow silica particles to the average particle size (205 nm) of the core-shell composite particles is 0.98.

Example 15

A precipitate was obtained in the same manner as in Example 14 except that 2 mL of the hydrogen peroxide solution (manufactured by KANTO CHEMICAL CO., INC., special grade, concentration: 30 mass %) was changed to 1 mL of nitric acid (manufactured by KANTO CHEMICAL CO., INC., EL grade, concentration: 61 mass %).

The precipitate was confirmed to be hollow silica particles by a transmission electron microscope. Further, the average particle size was 210 nm by a dynamic light scattering method. The proportion of the average particle size (210 nm) of the hollow silica particles to the average particle size (205 nm) of the core-shell composite particles is 1.02.

Example 16

A precipitate was obtained in the same manner as in Example 14 except that decomposition by addition of 2 mL of a hydrogen peroxide solution (manufactured by KANTO CHEMICAL CO., INC., special grade, concentration: 30 mass %) and decomposition by addition of 1 mL of nitric acid (manufactured by KANTO CHEMICAL CO., INC., EL grade, concentration: 61 mass %) were alternately carried out repeatedly.

The precipitate was confirmed to be hollow silica particles by a transmission electron microscope. Further, the average particle size was 218 nm by a dynamic light scattering method. The proportion of the average particle size (218 nm) of the hollow silica particles to the proportion of the average particle size (205 nm) of the core-shell composite particles is 1.06.

Example 17

A precipitate was obtained in the same manner as in Example 14 except that core-shell composite particles having an inner core comprising a polystyrene particle and an outer shell comprising silica and having an average particle size of 48 nm were obtained.

The precipitate was confirmed to be hollow silica particles by a transmission electron microscope. Further, the average particle size was 51 nm by a dynamic light scattering method. The proportion of the average particle size (51 nm) of the hollow silica particles to the average particle size (48 nm) of the core-shell composite particles is 1.06.

Example 18

A precipitate was obtained in the same manner as in Example 14 except that core-shell composite particles having an inner core comprising polymethyl methacrylate and an outer shell comprising silica and having an average particle size of 180 nm were obtained.

The precipitate was confirmed to be hollow silica particles by a transmission electron microscope. Further, the average particle size was 173 nm by a dynamic light scattering method. The proportion of the average particle size (173 nm)

of the hollow silica particles to the average particle size (180 nm) of the core-shell composite particles is 0.96.

Example 19

A precipitate was obtained in the same manner as in Example 14 except that the heating was by means of an electric heater set at 320° C., and that since volatilization of sulfuric acid (manufactured by KANTO CHEMICAL CO., INC., EL grade, concentration: 96 mass %) was intense, 20 mL of sulfuric acid was further added, and then a hydrogen peroxide solution (manufactured by KANTO CHEMICAL CO., INC., special grade, concentration: 30 mass %) was added.

The precipitate was confirmed to be hollow silica particles by a transmission electron microscope. Further, the average particle size was 222 nm by a dynamic light scattering method. The proportion of the average particle size (222 nm) of the hollow silica particles to the average particle size (205 nm) of the core-shell composite particles is 1.08.

Comparative Example 5

The core-shell composite particles obtained by the method in Example 13 were dried at 105° C. for 1 hour and heated by a muffle furnace in the air at 600° C. for 1 hour to remove the organic polymer thereby to obtain a white powder.

The obtained white powder was confirmed to be hollow silica particles by a transmission electron microscope. 0.1 g of the white powder was added to 50 mL of distilled water and dispersed by an ultrasonic cleaner for 30 minutes, and then the average particle size was measured by a dynamic light scattering method, whereupon it was 350 nm. The proportion of the average particle size (350 nm) of the hollow silica particles to the average particle size (205 nm) of the core-shell composite particles is 1.71. The average particle size increased as compared with the composite particles before the hollow treatment, and the agglomerates were formed.

Comparative Example 6

To 1 g of the core-shell composite particles obtained in Example 13, 5 mL of sulfuric acid (manufactured by KANTO CHEMICAL CO., INC., EL grade, concentration: 96 mass %) and 20 mL of nitric acid (manufactured by KANTO CHEMICAL CO., INC., EL grade, concentration: 61 mass %) were simultaneously added and heated in a sand bath at 270° C. for 1 hour. The liquid became yellow, and did not whiten even when heated in a sand bath at 270° C. The particles were collected by centrifugal separation , whereupon the precipitate was yellow.

As observed by a transmission electron microscope, the collected particles were not hollow.

Comparative Example 7

The same operation as in Example 14 was carried out except that heating was by an oil bath at 150° C. The liquid yellowed, but no white precipitate was obtained. As observed by a transmission electron microscope, the precipitate was not hollow.

As is evident from the results of Examples and Comparative Examples, according to the present invention, hollow particles with a low degree of agglomeration and having a high roundness can be obtained.

INDUSTRIAL APPLICABILITY

The hollow particles of the present invention and a slurry obtained by dispersing them are suitably used for a raw material of hollow silica particles to be used as a low refractive index filler used in an optical application, an antireflection material, a low dielectric constant material, a filler such as an insulating material, or a carrier for drug delivery system, and is industrially useful.

The entire disclosures of Japanese Patent Application No. 2007-167582 filed on Jun. 26, 2007, Japanese Patent Application No. 2008-147083 filed on Jun. 4, 2008 and Japanese Patent Application No. 2008-147820 filed on Jun. 5, 2008 including specifications, claims, drawings and summaries are incorporated herein by reference in their entireties.

The invention claimed is:

1. A method for producing hollow particles, which comprises adding sulfuric acid to a liquid, said liquid comprising (1) spherical organic polymer-silicon compound composite particles having a core comprising an organic polymer and a shell comprising a silicon compound in (2) a medium comprising at least 95 mass % of water, followed by heating the liquid with the added sulfuric acid to carbonize the organic polymer thereby to convert it to a carbide, and subjecting the carbide to decomposition using a liquid oxidizing agent other than sulfuric acid.

2. The method for producing hollow particles according to claim 1, wherein to the liquid comprising spherical organic polymer-silicon compound composite particles, sulfuric acid is added in an amount of from 10 to 200 mL per 1 g of the spherical organic polymer-silicon compound composite particles contained in the liquid.

3. The method for producing hollow particles according to claim 1, wherein the heating temperature after sulfuric acid is added is from 200° C. to 300° C., and the liquid oxidizing agent is at least one member selected from the group consisting of nitric acid, hydrogen peroxide and a chloric acid.

4. The method for producing hollow particles according to claim 2, wherein the heating temperature after sulfuric acid is added is from 200° C. to 300° C., and the liquid oxidizing agent is at least one member selected from the group consisting of nitric acid, hydrogen peroxide and a chloric acid.

5. A method for producing hollow particles, which comprises adding at least one liquid oxidizing agent selected from the group consisting of hydrogen peroxide, hypochlorous acid, chlorous acid, chloric acid and perchloric acid, and nitric acid, to a liquid comprising (1) spherical organic polymer-silicon compound composite particles having a core comprising an organic polymer and a shell comprising a silicon compound in (2) a medium comprising at least 95 mass % of water, followed by heating the liquid with the added liquid oxidizing agent to a temperature of from 100 to 150° C. to subject the organic polymer to decomposition.

6. The method for producing hollow particles according to claim 5, wherein to the liquid comprising spherical organic polymer-silicon compound composite particles, the liquid oxidizing agent is added in an amount of from 30 to 200 mL per 1 g of the spherical organic polymer-silicon compound composite particles contained in the liquid.

7. A method for producing hollow particles, which comprises treating the hollow particles obtained by the production method as defined in any one of claims 1 to 6 in hot water of from 80 to 200° C. or pressurized hot water of from 80 to 200° C.

8. The method for producing hollow particles according to any one of claims 1 to 6, wherein the silicon compound is silica.

9. The method for producing hollow particles according to any one of claims 1 to 6, wherein the organic polymer is a homopolymer of one monomer or a copolymer of two or more monomers, wherein the monomer(s) is(are) selected from the group consisting of styrene, a methacrylate and an acrylate.

* * * * *